United States Patent [19]

Richardson

[11] 4,328,049
[45] May 4, 1982

[54] TORCH HEIGHT SENSING APPARATUS

[75] Inventor: Richard W. Richardson, Dunlap, Ill.

[73] Assignee: Caterpillar Tractor Co., Peoria, Ill.

[21] Appl. No.: 84,000

[22] PCT Filed: Mar. 20, 1979

[86] PCT No.: PCT/US79/00174

§ 371 Date: Mar. 20, 1979

§ 102(e) Date: Mar. 20, 1979

[87] PCT Pub. No.: WO80/02001

PCT Pub. Date: Oct. 2, 1980

[51] Int. Cl.³ .............................................. B23K 7/00
[52] U.S. Cl. ..................... 148/9 R; 266/76; 318/637; 318/650
[58] Field of Search ................. 148/9 R; 219/124.02, 219/124.03; 266/76; 318/637, 650, 670

[56] References Cited

U.S. PATENT DOCUMENTS

| 2,364,645 | 12/1944 | Mott et al. | 266/76 |
|---|---|---|---|
| 2,534,958 | 12/1950 | Deming | 148/9 R |
| 2,949,391 | 8/1960 | Anderson | 148/9 R |
| 3,398,342 | 8/1968 | Redman | 318/650 |
| 3,809,308 | 5/1974 | Roeder et al. | 266/76 |
| 3,823,928 | 7/1974 | Stolin et al. | 266/76 |
| 3,928,790 | 12/1975 | Schmall | 148/9 R |
| 4,156,125 | 5/1979 | Brown | 219/124.02 |
| 4,170,727 | 10/1979 | Wilkins | 219/124.03 |

FOREIGN PATENT DOCUMENTS

| 2291535 | 6/1976 | France | 266/76 |
|---|---|---|---|
| 192001 | 1/1967 | U.S.S.R. | 219/124.02 |

Primary Examiner—John P. Sheehan
Attorney, Agent, or Firm—William A. Vansanten

[57] ABSTRACT

A torch height sensing apparatus (10) is provided for generating information representative of the spacing between a cutting torch (12) and an associated workpiece (14). The apparatus (10) drives a preselected current from the torch (12) through the torch flame to the workpiece (14) so that electrons flow from the workpiece (14) through the flame to the torch (12). The output current biases the flame into the linear region of the preselected voltage-current characteristic at a positive torch (12) to workpiece (14) current. Biasing the torch (12) for positive current flow from the torch (12) to the workpiece (14) insures that flame height sensing occurs in the positive linear region where the sensitivity is greatest due to the availability of thermally emitted electrons at the workpiece.

18 Claims, 9 Drawing Figures

TORCH HEIGHT SENSING APPARATUS

DESCRIPTION

1. Technical Field

This invention relates to apparatus for sensing and controlling the height of a cutting torch above a workpiece and more particularly to a signal processor for processing voltage and current information about the torch flame to obtain the height of the cutting torch above the workpiece.

2. Background Art

In a flame cutting machine one or more gas operated cutting torches are acted on by a drive mechanism which causes the torches to cut along one or more workpieces in accordance with a predetermined pattern. Efficient use of such machines is dependent on maintaining a precise optimum flame height or spacing of the torch from the associated workpiece as heat concentration varies substantially along the length of the flame. If the torch to workpiece spacing varies significantly in the course of cutting a workpiece, a nonuniform or possibly incomplete cut may be made and heat utilization becomes less efficient. The need for adjustment of torch height in the course of a cutting operation may arise from the fact that the workpiece has a nonplanar configuration. Moreover, sensitivity is such that slight irregularities in the surface of nominally flat plate stock may significantly affect cutting efficiency and accuracy.

In some prior flame cutting machines, adjustment of the flame height during the course of a cutting operation, was done manually by an operator who continually observed the cutting operation. A fully manual flame height control system has several disadvantages. First, more or less continuous attention is required and the operator is thereby prevented from accomplishing other tasks during the sometimes lengthy cutting operations. Second, the operator's task becomes more difficult, and quality of results is adversely affected in proportion to the number of torches employed on the cutting machine. Finally, the quality of the flame height control varies widely among different operators and is less than optimum under the best of circumstances. For these reasons, flame cutting machines are frequently provided with means for automatically controlling torch height during cutting operations.

Such automatic control requires a motor or other apparatus for advancing or retracting the torch relative to the workpiece in response to control signals and further requires apparatus for sensing the spacing of the torch from the workpiece surface in order to transmit corrective control signals to the motor when necessary.

Torch to workpiece space sensing devices employed in prior automatic torch height controls have included a variety of wheels, rollers, runners, sliding contacts and electrical capacitance measuring plates which extend from the torch towards the workpiece. These systems are complex, prone to malfunction and maintenance problems and are inherently susceptible to error in the presence of varying conditions, such as slag popping, at the surface of the workpiece. Moreover, such devices do not directly sense the spacing of the workpiece from the torch at the precise point of contact of the flame therewith but are instead displaced to one side of the flame.

Ideally, the sensing devices employed in an automatic torch height control should not require any mechanism extending from the torch to the surface of the workpiece and should act to sense changes in the spacing between the torch and workpiece at the precise point of contact of the flame with the workpiece. Further, such sensing devices and the controls associated therewith should individually control each torch in a multiple torch bank while providing for manual adjustment of the spacing to be maintained at all torches and for manually initiated raising or lowering of all torches simultaneously or with respect to any particular torch individually.

A system for maintaining a predetermined selectable torch to workpiece spacing in a flame cutting machine which does not require sensor structure extending from the torch to the workpiece is described in U.S. Pat. No. 3,823,928 which issued on July 16, 1974 to B. L. Stolin and R. D. Brown. The system is sensitive to minute changes in spacing of the torch from the precise point of contact of the flame with the workpiece. For this purpose, an electrical voltage is applied between the torch and the workpiece whereby an electrical current travels through the cutting flame. The flame is effectively a variable electrical resistor, the resistance of which is a function of the spacing of the workpiece from the torch. During operation, any variation of the electrical resistance of the flame is detected and a correction signal is generated to actuate a servomotor which restores the torch to workpiece spacing to the desired value. In one form of the system, a plurality of torches are utilized and the height control system provides for manual selection of a basic reference voltage that determines the automatically maintained spacing of each torch from the associated workpiece while further providing for individual fine adjustment of torch to workpiece spacing at each torch. Also in the preferred form, the control system provides for automatic shifting from a first torch height to a second torch height when the flame controls are shifted from a preheating fuel mixture to the cutting fuel mixture and still further provides a safety shutdown for preventing the automatic height control system from driving a torch towards the workpiece when the flame lengthens abruptly as a result of passing off the edge of the workpiece. Unfortunately, this system is sensitive to gas flows and mixtures, sensing bias voltage or current variations, and other spurious factors which interfere with its ability to sense torch height above a workpiece in a manufacturing environment.

DISCLOSURE OF INVENTION

In one aspect of the present invention, an apparatus generates a signal representative of the spacing of a cutting torch from a workpiece. The torch has a flame with a voltage-current characteristic having a linear portion at a positive current from torch to workpiece. The slope of this linear portion is inversely proportional to the true flame resistance. A positive current signal having a plurality of incremental steps is driven through the torch flame. The current level at each step lies substantially along the linear portion of the voltage-current characteristic. The voltage across the torch flame is detected. By maintaining the current level positive and along the linear portion of the voltage-current characteristic, the flame resistance can be measured substantially without detrimental influence by spurious variables.

In another aspect of the present invention, a torch control system comprises a torch, a workpiece, means for effecting relative movement between the torch and the workpiece, means for causing electrons to flow from the workpiece to the torch, and means for detecting a preselected characteristic of the electron flow and, responsive thereto, for operating the moving means and controlling the distance between the torch and the workpiece.

In another aspect of the present invention, a method for generating a signal representative of the spacing of a cutting torch from a workpiece is provided by biasing the torch and inducing a positive current flow from the torch to the workpiece, producing a current signal, driving the current from the torch through the torch flame to the workpiece, and detecting the voltage across the torch flame. By biasing the torch in this manner, the flame resistance is not substantially influenced by detrimental spurious variables.

BEST MODE FOR CARRYING OUT THE INVENTION

Figure 1:
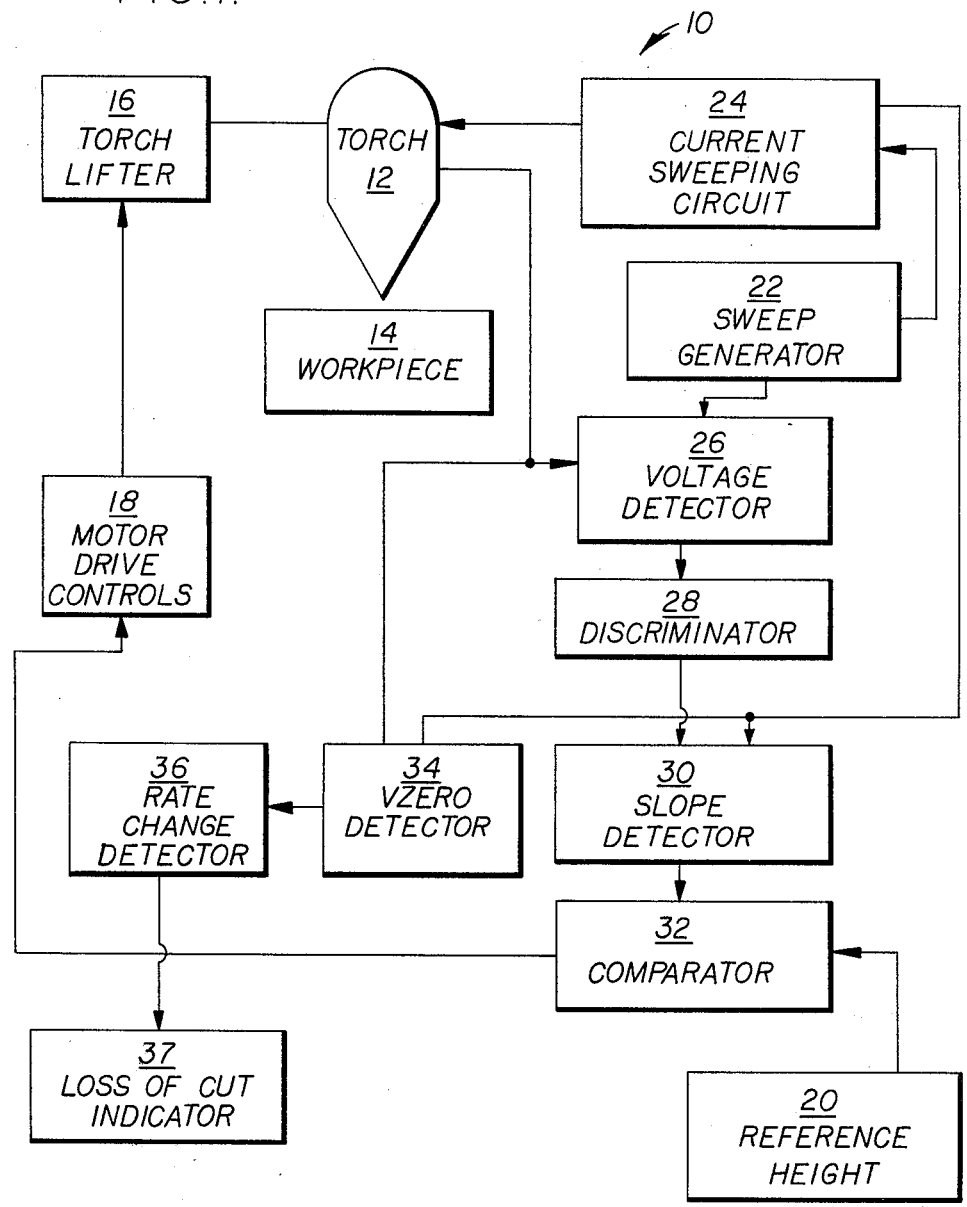
FIG. 1 is a block diagram of an apparatus for controlling the height of a cutting torch above a workpiece.

Referring to FIG. 1, a torch control system 10 is shown for controlling the height of a cutting torch 12 above an associated workpiece 14. The system 10 includes a torch lifter or drive motor 16 which effects relative movement between the cutting torch 12 and the workpiece 14 and a control unit 18 which controls operation of the torch lifter 16 to move the torch 12 and workpiece 14 towards or away from each other. The desired spacing between the torch 12 and workpiece 14 is determined by a reference height control unit 20 which is under the control of an operator. The system 10 compares the actual torch height above the workpiece 14 with the desired height set by the operator using the reference height control 20 and directs the motor control unit 18 and torch lifter 16 to drive the torch 12 toward or away from the workpiece 14 until the actual torch height above the workpiece substantially equals the reference height. In this manner the distance between the torch 12 and workpiece 14 is controlled without the need for further operator assistance.

The system 10 also includes a sweep generator 22 which drives a current sweeping circuit 24 which in turn drives current through the torch 12 to the workpiece 14. A voltage detecting circuit 26 detects the torch voltage and produces a signal representative of the torch to workpiece voltage. A discriminator 28 receives the voltage signal from the voltage detector 26 and blocks the passage of the voltage signal to the slope detector 30 when the voltage level exceeds a preselected value. The slope detector 30 receives the voltage signal from the discriminator 28 and a current signal from the current sweeping circuit 24 and produces a resistance signal. The resistance signal is representative of the spacing between the torch 12 and workpiece 14. The resistance signal is compared with a reference signal from the reference height control 20 by a comparator 32 which activates the motor controls 18. There is also a voltage detector 34 which detects the torch to workpiece voltage, VZERO, when the current from the torch 12 through the flame to the workpiece 14 is zero. A rate detector 36 senses an abrupt negatively going change in VZERO and indicates a loss of cut as will be more fully explained below.

Figure 2:
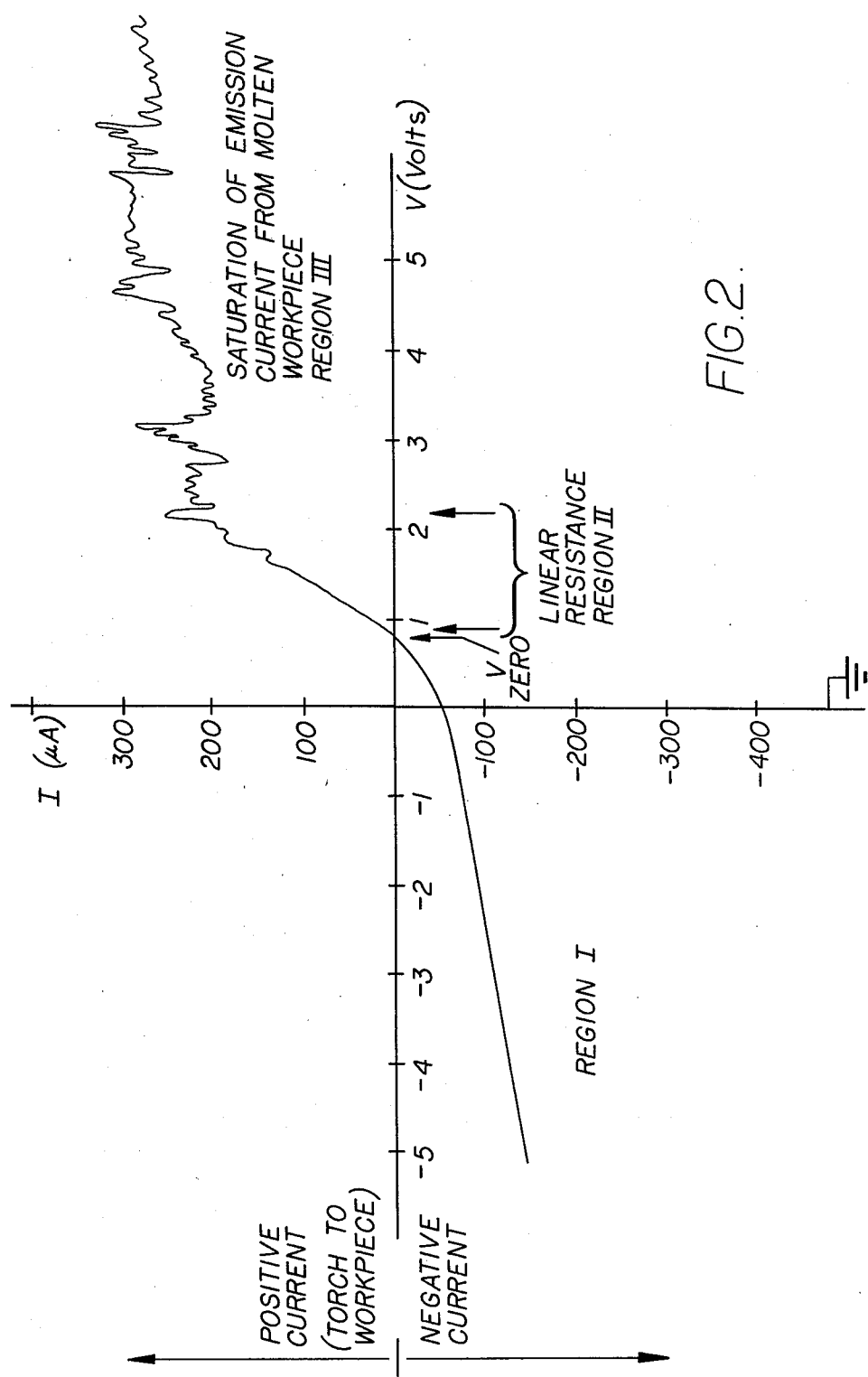
FIG. 2 is a curve showing voltage-current characteristic with a linear region at a positive current emphasized.

Referring to FIG. 2, a voltage-current characteristic, V-I curve, has three regions, Regions I, II and III.

Region I is a linear region wherein the flame current from the torch (12) to the workpiece 14 is negative. This region is relatively non-noisy, but the slope of the V-I curve is relatively flat. In this region electrons flow from the torch 12 through the flame to the workpiece 14 which sets up two basic resistances—flame resistance and flame-to-torch resistance. Flame-to-torch resistance arises from the difficulty encountered in trying to remove electrons from the torch surface. The flame-to-torch resistance is typically ten times the height dependent flame resistance; hence, sensitivity problems are encountered when sensing height in Region I. For example, a ten percent change in flame length would cause a ten percent increase in the flame resistance and would not affect the flame-to-torch resistance which would result in only about a one percent change in the total resistance; whereas, a one percent change in flame-to-torch resistance results in nearly a one percent change in total resistance. Thus, it is difficult to detect a change in resistance due to a change in flame length.

Region II is a linear region wherein the torch-to-workpiece current is positive. The slope of the V-I curve is much steeper in Region II than in Region I. Electrons flow from the workpiece 14 which is hot because it is heated by the torch flame. Since the hot workpiece emits many free electrons, the workpiece-to-flame resistance is very small compared with the flame resistance so that a change in the flame length changes the flame resistance which causes a corresponding change in the total resistance. In Region II the flame resistance has maximum sensitivity to flame length which is the distance of the torch from the workpiece 14.

Region III is a positive torch current region in which the ability of the workpiece 14 to deliver electrons saturates. This region provides little useful torch height information. Regions I and III each contain a large non-flame length dependent resistance which adversely affects the net flame length sensitivity. The steeper linear V-I curve of Region II is less sensitive to operating flame variables such as gas mixture, leakage resistance, etc.

In Region II the V-I curve does not cross voltage or current axes at zero. There is a voltage at zero current, VZERO. This voltage is produced by thermal effects associated with the flame and varies with flame cutting conditions. The linear region at voltages more positive than this flame generated voltage, VZERO, comprises the height dependent flame resistance. Additionally, a sudden decrease of this voltage is indicative of sudden torch travel over cold metal which means the cut has been lost. This abrupt drop in the voltage, VZERO, is sensed by the VZERO rate of change detector 36 and indicated by a loss of cut indicator 37. The output from the rate of change detector 36 can also be used to raise the torch 12 when the cut is lost.

Figure 5:
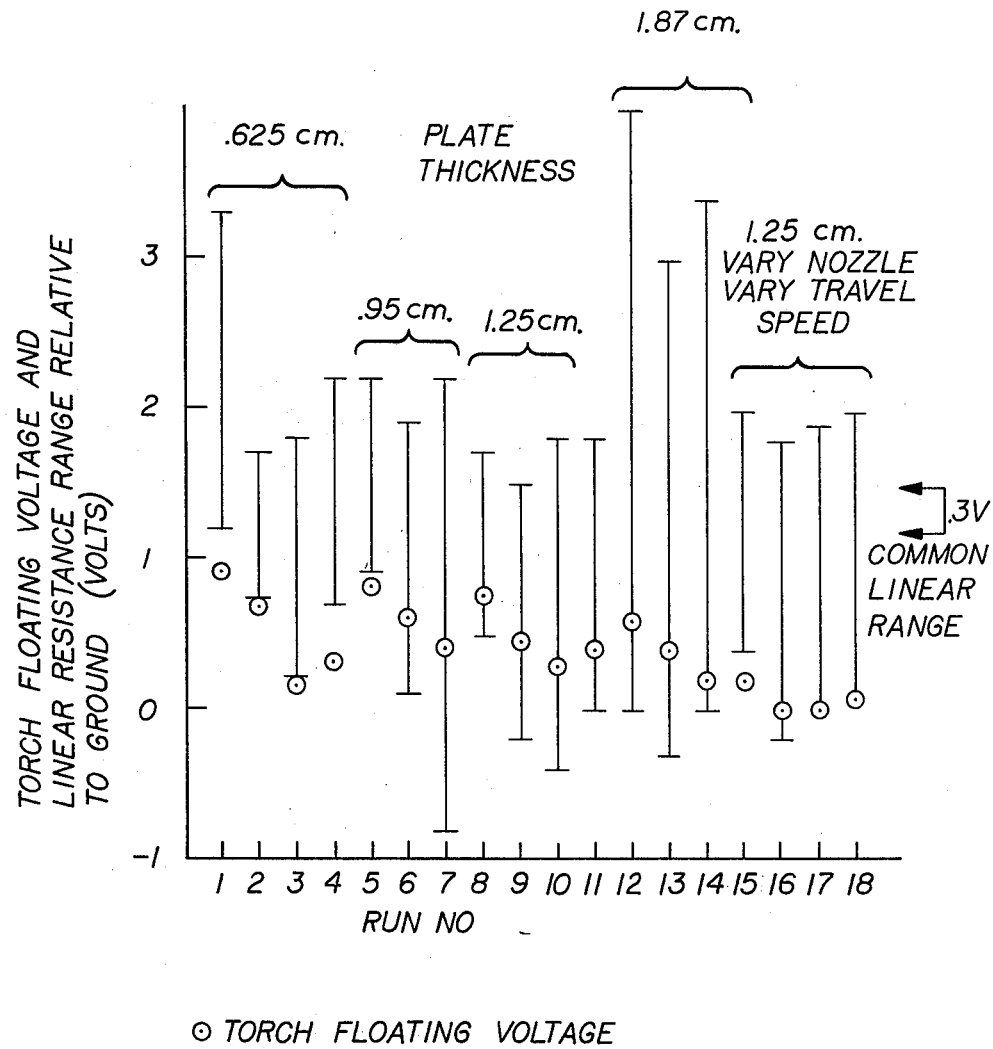
FIG. 5 is a bar graph showing torch floating voltage for various test conditions.
Figure 6:
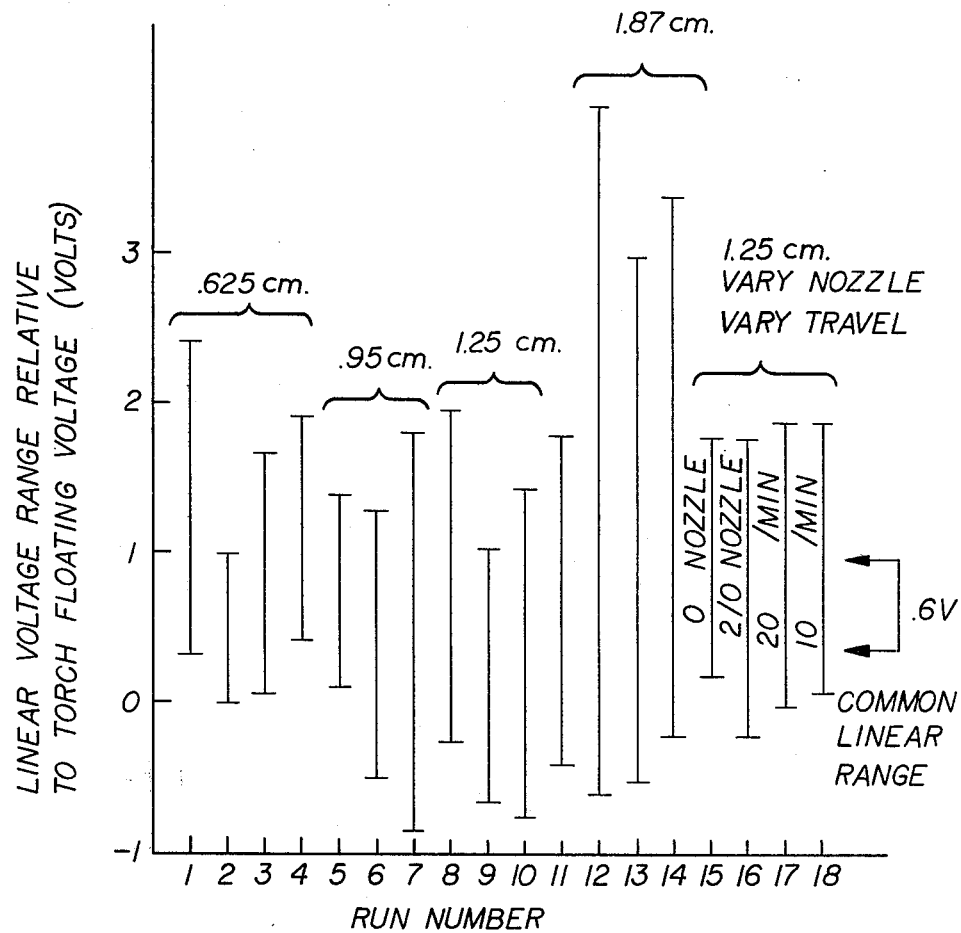
FIG. 6 is a bar graph showing the linear voltage range for various test conditions.

Referring to FIGS. 5 and 6, a complicating factor results from the existence of the flame generated voltage, VZERO, in that the voltage varies with flame cutting conditions. The test results summarized in FIG. 5 show that there is a common linear V-I range of about 0.3 v relative to ground at various conditions. VZERO is indicated by the encircled data points for each test run. VZERO is somewhat erratic for fixed conditions varying by as much as ±0.1 volt. On the other hand, FIG. 6 shows that there is a common linear V-I range of about 0.6 v relative to VZERO at various conditions. The common linear region is increased from 0.3 v to 0.6 v centered at about 0.7 v above VZERO. This common linear region is the most desirable linear region in which to sense resistance because it is common to the variables encountered in an industrial environment.

Figure 3:
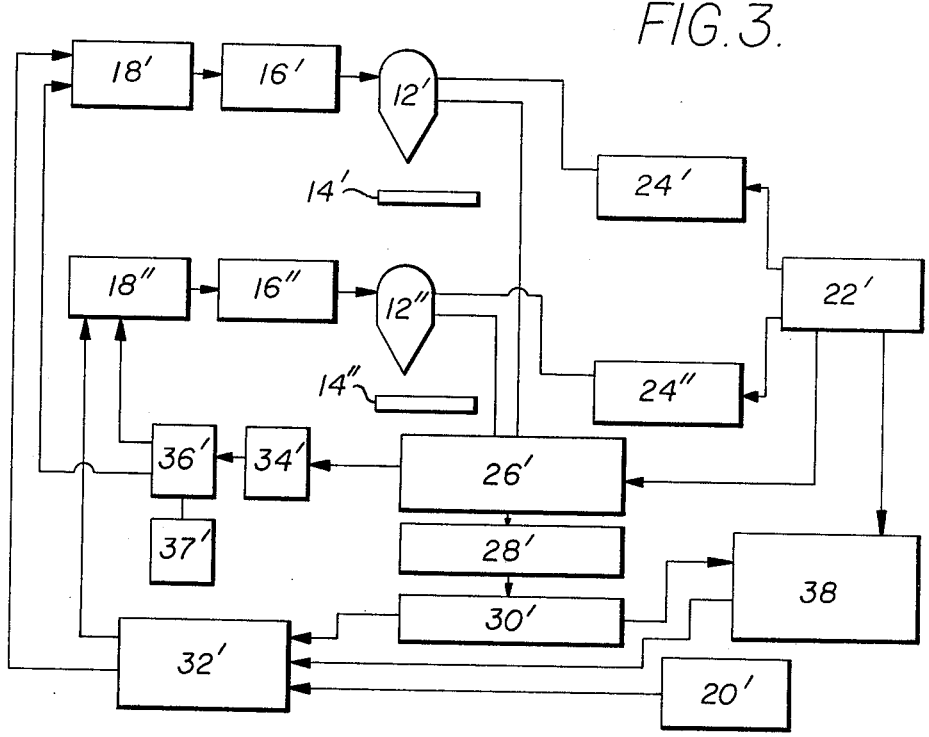
FIG. 3 is a block diagram similar to FIG. 1 but showing a plurality of cutting torches.
Figure 4:
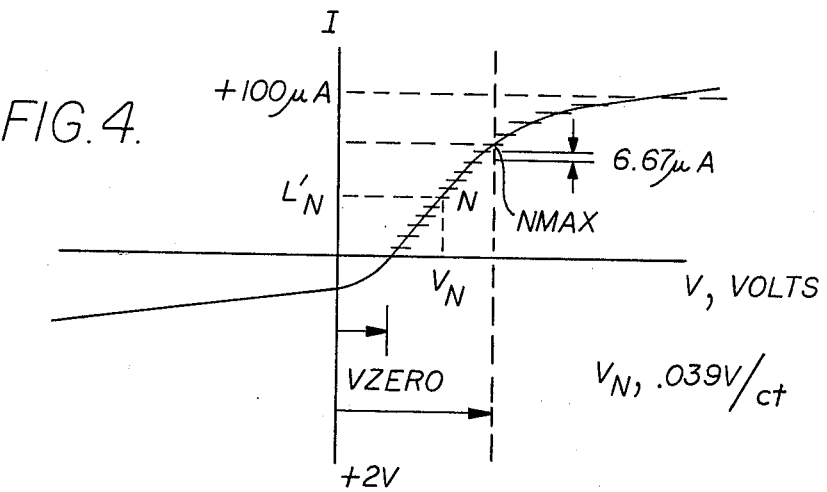
FIG. 4 is a view similar to FIG. 2 with the linear region emphasized.

Referring to FIGS. 1 and 3, the control system 10 causes electrons to flow from the workpiece 14 through the flame to the torch 12 which creates a torch-to-workpiece voltage which is representative of the flame length. This torch-to-workpiece voltage is representative of the flame length because the torch 12 is biased into Region II (FIG. 2) and the current driven by the current sweeping circuit 26 ranges from about 0 μa to about 100 μa or some other value which lies in the linear region (Region II) of the V-I curve. Various current levels are shown in FIG. 4.

The sweep generator 22 can be of any basic form such as a clock, counter or other function generator, for example. The current sweeping circuit 24 is a voltage to current converter which is also well known in the art. The waveform of the output voltage of the sweep generator 22 is preferably a staircase configuration as is the output current from the current sweeping circuit 24. These circuits and other circuits described herein are well known in the art and available in such handbooks as GUIDEBOOK OF ELECTRONIC CIRCUITS, SOURCEBOOK OF ELECTRONIC CIRCUITS, and ELECTRONIC CIRCUITS MANUAL by John Markus, as well as other handbooks in this field.

Preferably, the sweep generator 22 produces a known output voltage in incremental steps which is received by the current sweeping circuit 24 which converts the incremental voltage to an incremental current. When the output voltage is in 16 incremental steps between about 0 to 10 v, and there is a conversion factor of about −10.67 μa/v, the output current is in 16 incremental steps between about 0 to 100 μa which yields 6.67 μa per step and generally falls within the common linear region of the V-I curve. This current biasing approach insures that all measured voltages are above the flame generated voltage, VZERO, i.e., in Region II.

The sweep generator 22 is also connected to the voltage detecting circuit 26 which detects the torch-to-workpiece voltage at each current step. The voltage and current at each step are known. Since the current is fixed, the voltage level varies with torch-to-workpiece resistance which, in the common linear region, is essentially flame resistance. Because flame resistance varies with flame length, the voltage level varies with flame length which is equal to the spacing between the torch 12 and workpiece 14.

The output from the voltage detector 26 is received by the discriminator 28 which blocks voltage levels which are more than about 1.0 volt above VZERO and passes the voltages less than about 1.0 volt above VZERO. The discriminator 28 insures that the voltages received by the slope detector 30 fall within the common linear region of the V-I curve (FIG. 6).

The slope detector 30 receives the voltage output from the discriminator 28 and a current level indication from the current sweeping circuit 24. The output of the slope detector 30 is the slope of the V-I curve which is the flame resistance. The slope detector 30 can detect the slope of the V-I curve for each incremental current step and the corresponding voltage or detect the slope for the average current and voltage.

Dividing the torch voltage minus VZERO by the current at each step yields the resistance at each step or a least squares curve fit could be used to determine the average resistance over all steps.

The output signal from the slope detector 30 which is representative of flame resistance and thus flame length is compared with the reference signal from the reference height control 20 at the comparator 32 to operate the motor drive controls 18.

The VZERO detector 34 monitors the torch-to-workpiece voltage and the rate detector 36 senses an abrupt negative going change in VZERO to thereby sense a loss of cut. The rate detector 36 then indicates a loss of cut. The change in voltage is on the order of about 0.5 v.

Referring to FIG. 3, a torch control system 10' for controlling the movement of a plurality of torches 12',12" includes storage means 38 for storing the voltage levels, the current levels or both for use at a later time. Preferably, the slope information is stored and updated for each torch during each cycle of operation as the sweep generator 22' scans the torches 12',12".

Figure 7:
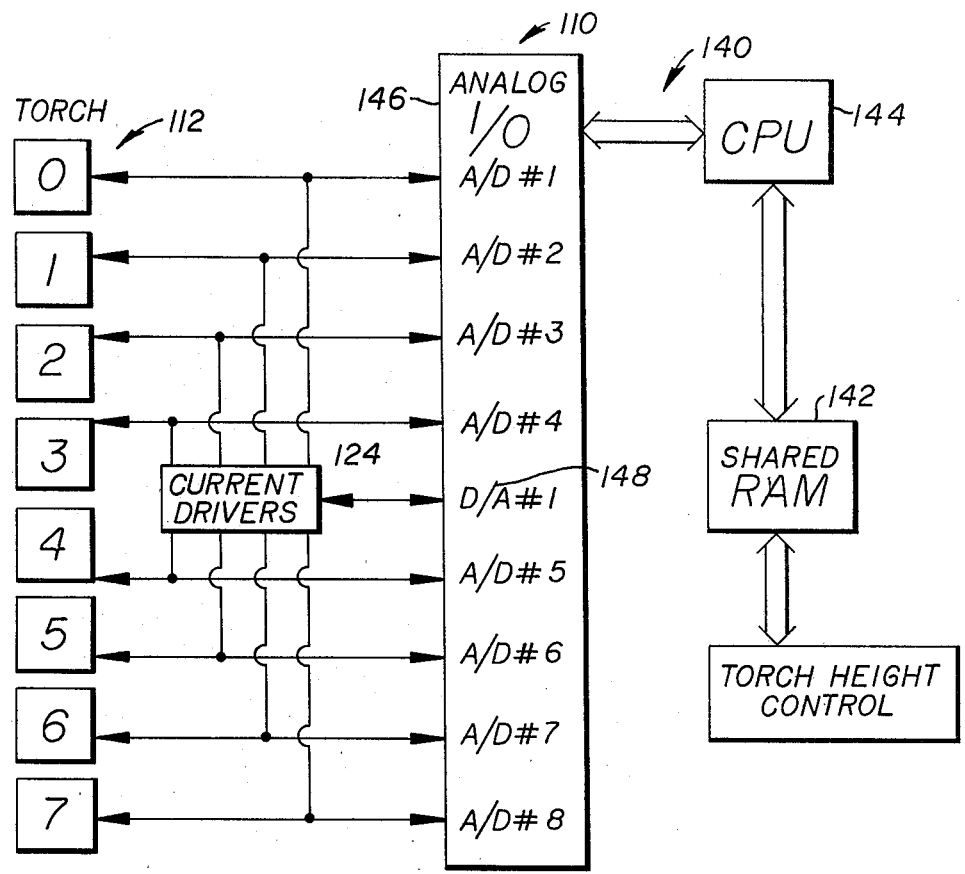
FIG. 7 is a block diagram similar to FIG. 1 but showing another embodiment.

Referring to FIG. 7. the control system 110 employs a computer 140 for generating and storing information representative of the spacing of a cutting torch 112 from a workpiece. The computer 140 has a storage means 142, a central processing unit 144 and an input/output device 146. The input/output device includes a digital-to-analog convertor 148 for driving a current sweeping circuit or current driver 124 and analog-to-digital convertors for receiving torch voltage and current information. The computer 140 basically performs the functions performed by the voltage detector 26, discriminator 28 and slope detector 30 of FIGS. 1 and 3 and stores the information in memory 142 and also monitors VZERO.

Industrial Applicability

In operation, a method for generating a signal representative of the spacing of a cutting torch 12 from a workpiece 14 is provided by biasing the torch 12 positive with respect to the workpiece 14 so that a positive current flows from the torch 12 to the workpiece 14, generating a voltage-current characteristic having a linear portion at a positive current, producing a current signal having a plurality of incremental steps, driving the current through the torch flame, maintaining the current substantially along the linear portion of the voltage-current characteristic, detecting the voltage across the torch flame, and determining the slope of the voltage-current characteristic using the detected voltage.

The inverse slope of the voltage-current characteristic (FIGS. 1 and 4) is the flame resistance. Since the current is fixed, the voltage varies with the flame resistance. Flame resistance varies with flame length which is the distance between the torch 12 and workpiece 14. Thus, the voltage varies with changes in the spacing between the torch 12 and workpiece 14.

Referring to FIG. 1, the sweep generator 22 produces a voltage signal having a plurality of steps which is changed to a current signal having an equal number of steps by the current sweeping circuit 24. The current sweeping circuit 24 drives the output current from the torch 12 through the flame to the workpiece 14 so that electrons flow from the hot workpiece 14 through the flame to the torch 12. Since the torch flame resists current flow therethrough, a voltage is developed across the flame. The voltage detector 26 detects the torch-to-workpiece voltage and the discriminator 28 discards voltages greater than about 1.0 volt above VZERO. The slope detector 30 receives the voltage and current information and produces the flame resistance which is the slope of the V-I curve formed by the injected current and the detected voltage.

The comparator 32 receives the slope information from the slope detector 30 and a reference signal from the reference height control 20 to drive the torch 12 away from the workpiece 14 if the measured slope is less than the reference slope and toward the workpiece if the measured slope is greater than the reference slope. If the slopes are the same, the torch 12 does not move because it is correctly positioned.

The VZERO detector 34 monitors the torch-to-workpiece voltage when the flame current is zero and the rate detector 36 senses an abrupt negative going change in VZERO and the indicator 37 indicates a loss of cut.

Referring to FIG. 3, the sweep generator 22' simultaneously delivers the stepped output voltage to the current sweeping circuits 24', 24". While the current sweeping circuits 24' and 24" are activated, the associated components function as described above with the exception of the slope detector 30' which can function normally as described above or can pass the slope information to the storage means 38. The storage means 38 transmits the slope information to the comparator 32' for comparison with the reference height information and operation of the torches 12',12".

Figure 8:
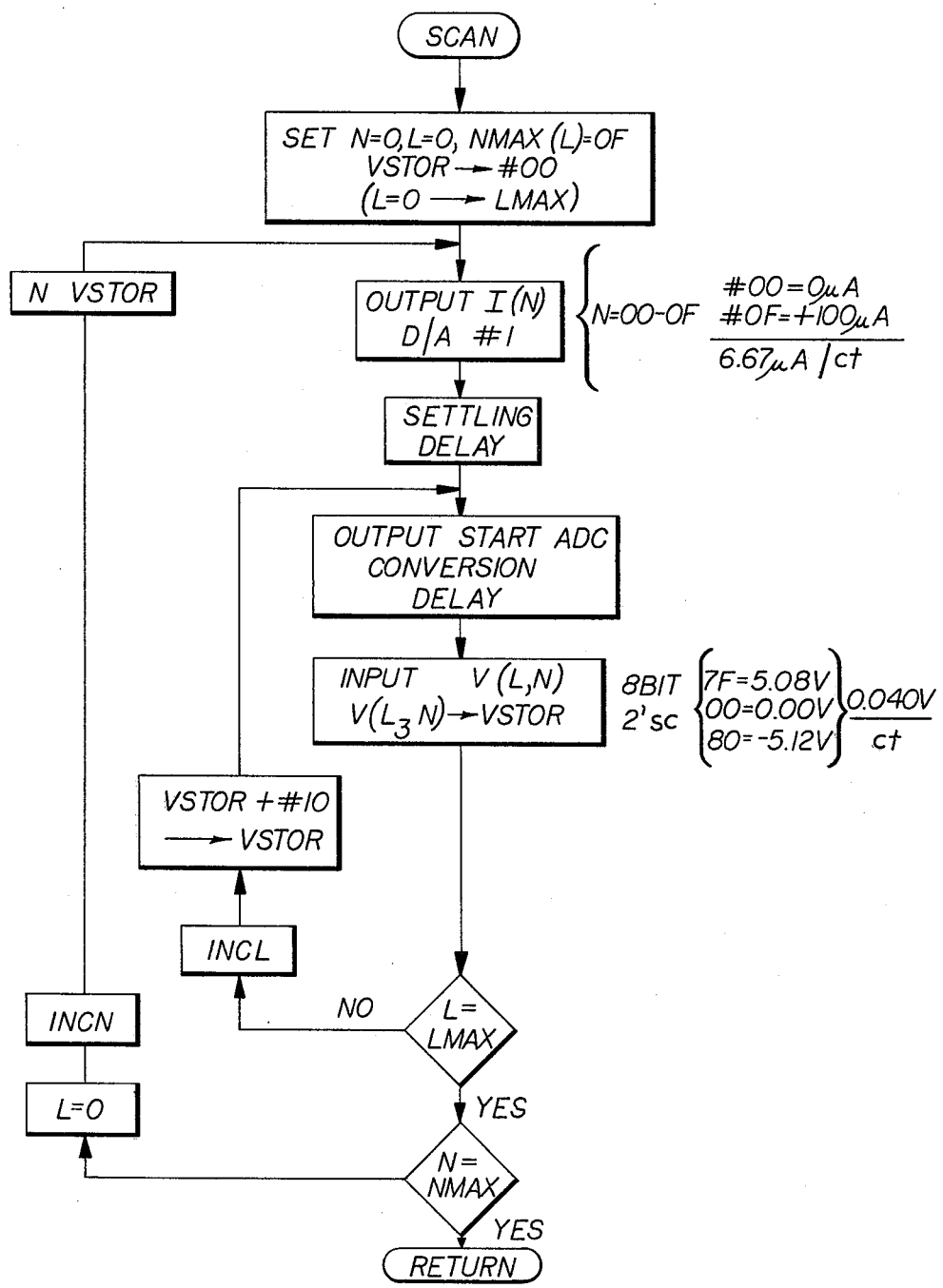
FIG. 8 is a partial flow chart for use with the apparatus of FIG. 7.
Figure 9:
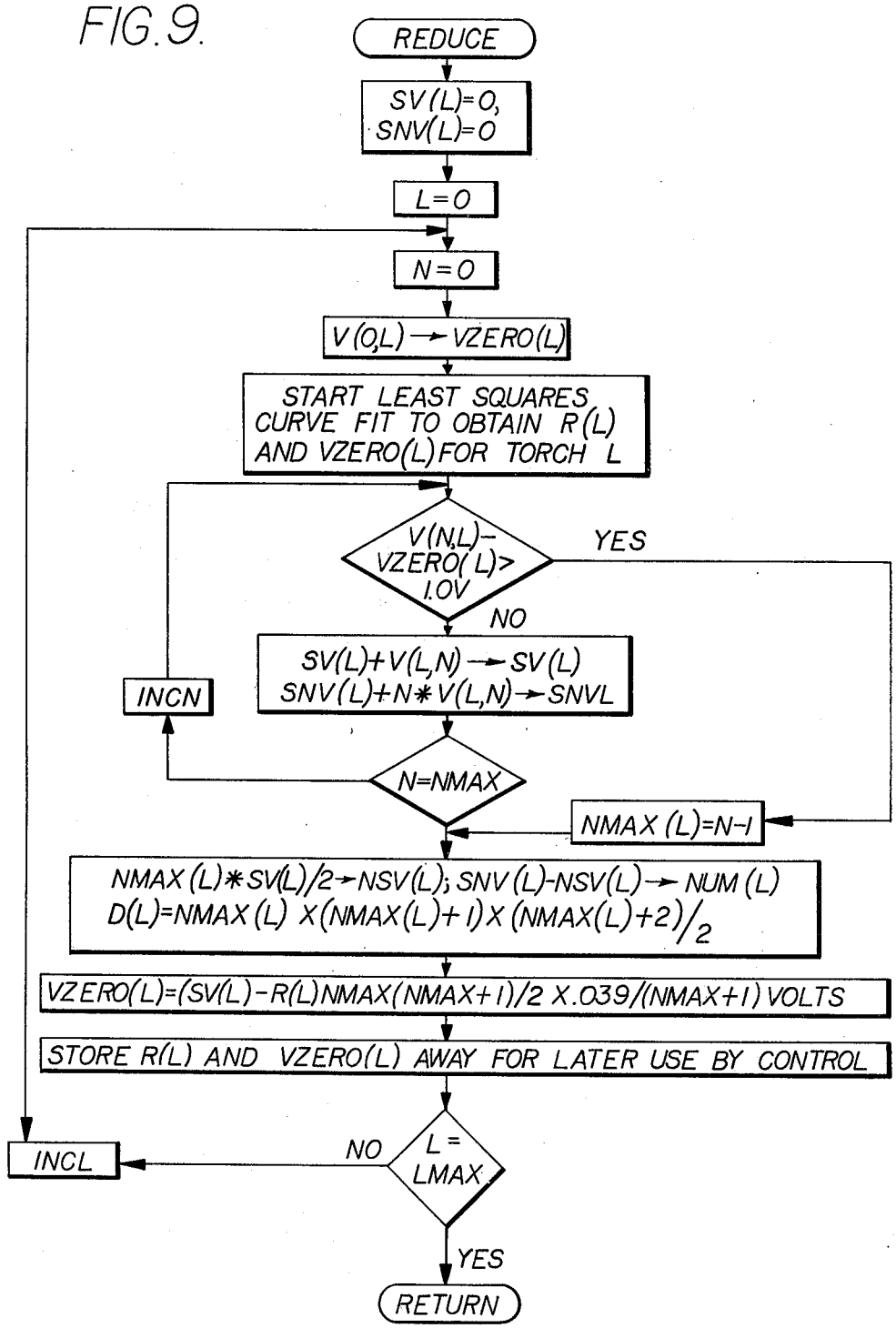
FIG. 9 is a partial flow chart for use with the apparatus of FIG. 7.

Referring to FIGS. 7-9, the current sweeping circuits or current drivers 124 drive an output current through the torches 112 so that the torch current falls within the linear range which is experimentally found to persist up to about 1.0 volt above the flame generated voltage. The input to the current drivers 124 is a repeating bias step and the output is an increasing bias current step which is driven through the flame. When the input bias voltage is in 16 incremental steps between about 0 to 10 v, and there is a conversion factor of about −10.0 microamperes per volt, the output current is in 16 incremental steps between about 0 to 100 microamperes which falls mostly on the common linear V-I curve. This current biasing approach insures that all data points are above VZERO.

The input voltage bias step is delivered by a digital-to-analog converter, D/A1, which is part of input/output interface 146. I/O 146 contains eight analog-to-digital convertors, A/D1 through A/D8, which receive the flame voltage and VZERO information.

Referring to FIGS. 7-9, the apparatus 110 can be called a torch flame signal processing system, SPS, because it processes the flame information according to the flow chart which primarily consists of two routines, SCAN and REDUCE. For the flow chart, the following labels are used:

| Label | Definition |
|---|---|
| N | data point index |
| NMAX | number of data points per torch (current levels) |
| L | torch number |
| LMAX | number of torches |
| I(N) | output current to torches |
| VSTOR | torch voltage storage pointer |
| V(N,L,) | torch voltage (torch L, Point N) |
| SNV(L) | $\Sigma_N NV(N,L)$ |
| SV(L) | $\Sigma_N V(N,L)$ |
| NSV(L) | $N_N V(N,L)$ |
| NMAX(L) | number of incremental current levels in linear range |
| D(L) | (NMAX(L)+1) (NMAX(L)) (NMAX(L)+2)/12 |
| R(L) | (SNV(L)−NSV(L))/D(L), flame resistance |
| VZERO(L) | flame generated voltage for torch L from least squares curve fit |
| VZERO(O,L) | torch voltage at zero output current level |
| ADC | analog-to-digital convertor multiplexer code |

The input voltage to the current drivers 124 is commanded by processor 144 via D/A1. This voltage is in the form of a repeating bias step. Each of the current drivers 124 converts this voltage step by the factor of about about −10 microamperes per volt to an increasing bias current step which is driven through the flame load. The output voltage of each of the current drivers 124 is the voltage across its corresponding load. This voltage is fed back to the processor 16 via A/D1 through A/D8. Thus, the processor has a digital representation of the commanded load current and each sensed load voltage from which each flame V-I curve can be calculated. The time between samples for each torch is preferably approximately 100 microseconds which allows the analog-to-digital convertors sufficient time to recover from saturation which can occur when a torch with no flame is encountered. An infinite load created by a no flame condition would ordinarily cause the output of the current driver 124 to saturate.

Referring to FIG. 8, the flow chart for routine SCAN shows that all torches are simultaneously biased to one of 16 current levels between 0 and +100 microamperes (N=0-15 (F)). At a given bias current each torch voltage is converted to 2's complement binary and read in sequence. The data are stored in RAM memory 18 in 16 byte blocks. The high 4-bits of the page address designates the torch (L=0-7, torch #0-7) and the low 4-bits the bias current level (N=0-15) for the configuration of FIG. 7 with 8 torches 112.

Referring to FIG. 9, the REDUCE routine calculates a least squares fit of the voltage points recorded by the SCAN routine, and stores R(L), the calculated flame reistance, and VZERO, the voltage of the flame with no current applied. The data is reduced by applying a 16 point least squares fit of a straight line to the V-I curve for each torch. The slope of this line is the flame resistance and is proportional to flame height. The curve fit will be effectively less than 16 points (i.e. NMAX(L)) for those curves for which the flame voltage reaches 1.0 volt above VZERO before the last current bias level is reached (100 microamperes, N=15). The flame resistances will be placed at 8 locations in the memory 16 as 8-bit natural binary number with a scale factor of 730 ohms/ct. This allows a resistance of 186.2 Kohms full scale. If the flame resistance exceeds this range an indication is sent to the control system that either the flame is extinguished or an edge of the workpiece has been encountered. This indication is in the form of a flame resistance indication greater than about 186.2 kohms.

The floating voltage will also be placed in memory for each torch to the scale of the input voltages. With a 50 microsecond A/D conversion time, the SCAN routine should require less than 10 milliseconds for eight torches. The reduce routine requires about 5 milliseconds per torch. This means that torch height information will be updated about every 50 milliseconds for eight torches.

Other aspects, features and advantages of this invention can be obtained from a study of the drawings, the disclosure and the appended claims.

I claim:

1. A torch control system (10) for controlling the proximity of a torch (12) to a working piece (14) comprising:
   a torch (12);
   means (16,18) for effecting relative, toward and away, movement between the torch (12) and a workpiece (14);
   means (22,24) for interconnecting a workpiece (14) and said torch (12) for causing electrons to flow from a workpiece (14) to the torch (12) at a predetermined varying rate;
   means (26) associated with said interconnecting means (22,24) for detecting a predetermined characteristic of the electron flow; and
   means (26,28) responsive to said detecting means for operating the moving means and controlling the distance between the torch (12) and a workpiece (14).

2. The torch control system (10) of claim 1, wherein said electron flow causing means (22,24) is a variable current generator (24) and said detecting means (26) detects voltage.

3. The torch control system (10) of claim 2, wherein said variable current generator (24) generates a plurality of distinct current increments.

4. The torch control system (10) of claim 1, wherein the detecting means (26) detects torch-to-workpiece voltage, said touch-to-workpiece voltage consisting substantially of the voltage across the torch flame the, torch-to-flame and flame-to-workpiece voltages being negligible.

5. An apparatus (10) for generating a signal representative of the resistance of a cutting torch flame, comprising:
   means (22,24) for producing current increments in step-wise fashion, including a zero current step, and driving the current from the torch (12) through the flame thereof to the workpiece (14) so that electron flow is from the workpiece (14), along the flame and to the torch (12); and
   means (26) for detecting the voltage at each step of current flow including said zero current step.

6. An apparatus (10), as set forth in claim 5, including means (30) for sensing an abrupt negative going change in the voltage of said zero current step.

7. An apparatus (10), as set forth in claim 5, including means (16,18) for effecting relative movement between the torch (12) and the workpiece (14); and means responsive to the detecting means (26) for operating the moving means (28) and controlling the distance between the torch (12) and the workpiece (14).

8. An apparatus (10), as set forth in claim 5, wherein the means (22,24) for producing current increments produces current in the range of about 0 to 100 microamperes.

9. An apparatus (10), as set forth in claim 8, wherein the current is produced in incremental steps of about 6.67 microamperes.

10. An apparatus (10) for generating a signal representative of the spacing of a cutting torch (12) from a workpiece (14) said torch (12) having a flame with a preselected voltage-current characteristic having a linear portion at a positive torch-to-workpiece current, comprising:
    means (22,24) for producing a current signal having a plurality of incremental steps and driving the current signal through the torch flame, the current level at each step lying substantially along the linear portion of the preselected voltage-current characteristic; and
    means (26) for detecting the voltage across the torch flame.

11. An apparatus (10), as set forth in claim 10, wherein the current signal varies from about 0 to 100 microamperes and is produced in 16 increments of about 6.67 microamperes.

12. An apparatus (10), as set forth in claim 10, including a plurality of torches (12',12") and associated workpieces (14',14") and means (22') for connecting the producing means (22,24) and detecting means (26) to each of said torches and associated workpieces.

13. An apparatus (10), as set forth in claim 10, including means (32) for storing the voltage information.

14. A method for generating a signal representative of the spacing of a cutting torch (12) from a workpiece (14), comprising:
    biasing the torch (12) positive with respect to the workpiece (14);
    generating a preselected voltage-current characteristic having a linear portion at a positive current;
    producing a current signal;
    driving the current through the torch flame;
    maintaining the current substantially along the linear portion of the preselected voltage-current characteristic; and
    detecting the voltage across the torch flame.

15. A method, as set forth in claim 14, including producing the current signal in a plurality of incremental steps.

16. A method, as set forth in claim 14, including determining the slope of said linear portion of the preselected voltage-current characteristic.

17. A method, as set forth in claim 14, including detecting the slope of the flame voltage-current characteristic.

18. A method for generating a signal representative of the spacing of a cutting torch (12) from a workpiece (14), comprising:
    biasing the torch (12) and inducing a positive current flow from the torch (12) to the workpiece (14);
    producing a current signal;
    driving the current incrementally from the torch (12) through the torch flame to the workpiece (14); and
    detecting the voltage across the torch flame for a plurality of current increments.

* * * * *